Figure 1:
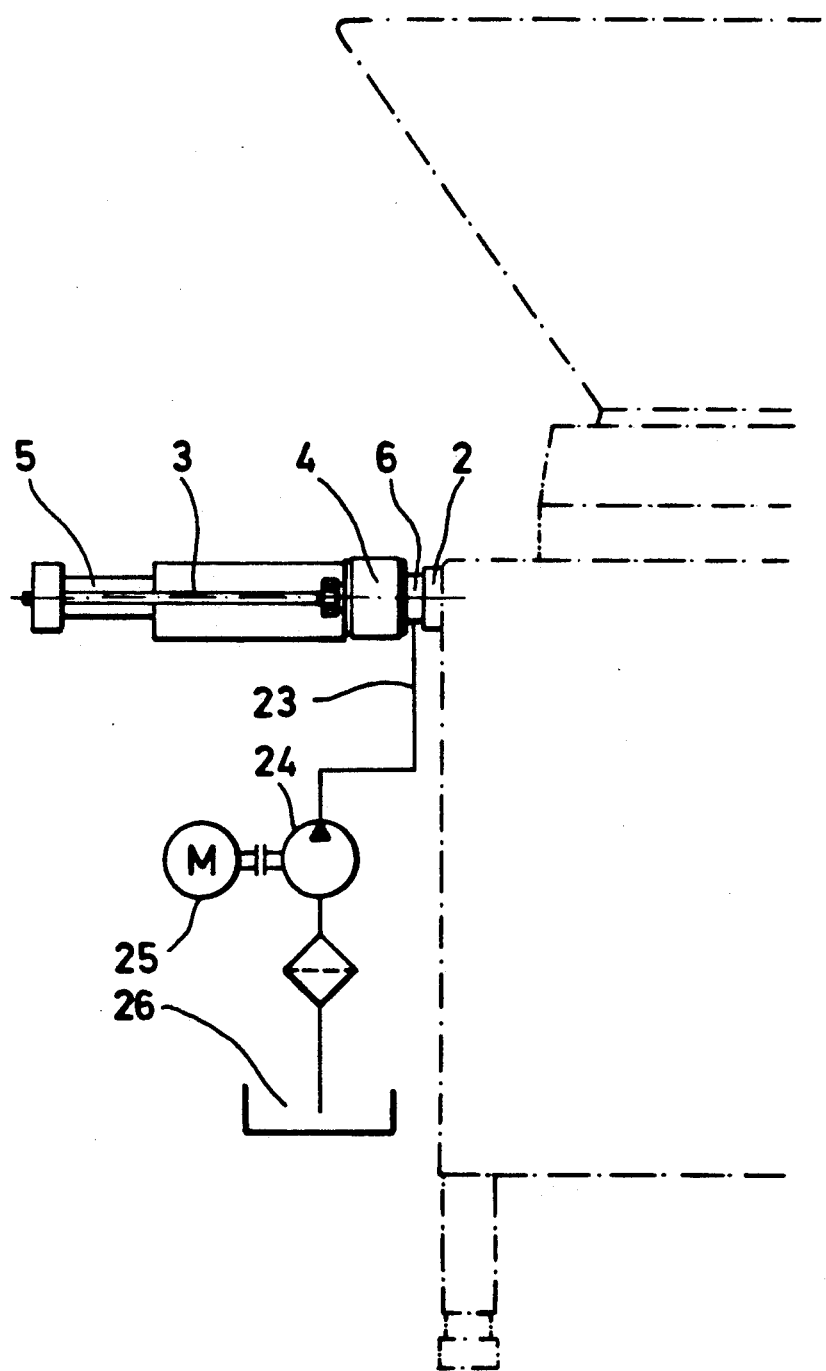

United States Patent
Kern et al.

Patent Number: 5,100,363
Date of Patent: Mar. 31, 1992

[54] APPARATUS FOR CONDUCTING A PASTY MASS UNDER FEED PRESSURE THROUGH A TUBE

[75] Inventors: Manfred Kern, Ummendorf; Georg Staudenrausch, Biberach-Rissegg, both of Fed. Rep. of Germany

[73] Assignee: Albert Handtmann Maschinenfabrik GmbH & Co. KG, Fed. Rep. of Germany

[21] Appl. No.: 580,555

[22] Filed: Sep. 11, 1990

[30] Foreign Application Priority Data

Oct. 3, 1989 [DE] Fed. Rep. of Germany ....... 8911781

[51] Int. Cl.$^5$ ............................................. A22C 11/02
[52] U.S. Cl. ........................................ 452/45; 452/27; 452/40
[58] Field of Search .................... 452/30, 31, 35, 40, 452/45, 27; 426/105

[56] References Cited

U.S. PATENT DOCUMENTS

| | | | |
|---|---|---|---|
| 3,657,769 | 4/1972 | Martinek | 452/27 |
| 3,892,009 | 7/1975 | Townsend | 452/45 |
| 3,901,279 | 8/1975 | Schnell | 452/31 |
| 4,086,684 | 5/1978 | Trimble | 452/27 |
| 4,307,489 | 12/1981 | Niedecker | 452/32 |

*Primary Examiner*—Willis Little
*Attorney, Agent, or Firm*—Finnegan, Henderson, Farabow, Garrett & Dunner

[57] ABSTRACT

The present invention solves the problem of clogging in the case of an apparatus for conducting a pasty mass, preferably sausage meat, under feed pressure through a tube, which carries said mass and the interior of which communicates via an annular groove and an annular gap with an external supply means for a lubricant which is to be forced under high pressure between the inner wall of the tube and the surface of the pasty mass, said problem being solved in such a way that an inner annular recess of the tube has arranged therein a sleeve-shaped sliding piston, the end face of which is acted upon by the lubricant in an annular groove, said sliding piston being adapted to be axially displaced within said inner annular recess against the force of a pretensioned spring in such a way that, in the case of low lubricant pressure, it closes the annular gap by means of an annular shoulder provided on the end face and protruding axially beyond the the annular groove in said end face and that, in the case of high lubricant pressure, it opens said annular gap so that no sausage meat can penetrate into the annular gap in the case of pressure fluctuations in the lubricant.

5 Claims, 2 Drawing Sheets

APPARATUS FOR CONDUCTING A PASTY MASS UNDER FEED PRESSURE THROUGH A TUBE

DESCRIPTION

The present invention refers to an apparatus for conducting a pasty mass, preferably sausage meat, under feed pressure through a tube, which carries said mass and the interior of which communicates via an annular groove and an annular gap with an external supply means for a lubricant which is to be forced under high pressure between the inner wall of the tube and the surface of the pasty mass.

Such an apparatus is known from German patent specification 23 04 715.

In the case of this known apparatus, an annular gap is provided which is always open. If, due to pressure variations, the pressure in the lubricant is lower than the pressure in the sausage meat, the sausage meat will be pressed into the annular gap due to the excessive pressure so that this annular gap will clog. Moreover, it is necessary to provide a control means so as to guarantee that the lubricant supply means is already started before the sausage meat is pressed through and that, in addition, the sausage meat feed operation is immediately interrupted when the pressure in the lubricant fails.

The present invention is based on the task of constructing such a known apparatus in such a way that clogging of the annular gap with sausage meat in the case of pressure variations in the lubricant is prevented without any complicated control being necessary.

In order to solve this task, the present invention provides in such an apparatus an inner annular recess in the tube having arranged therein a sleeve-shaped sliding piston, the end face of which is acted upon by the lubricant in an annular groove, said sliding piston being adapted to be axially displaced within said inner annular recess against the force of a pretension spring in such a way that, in the case of low lubricant pressure, it closes the annular gap by means of an annular shoulder provided on the end face and protruding axially beyond the annular groove in said end face and that, in the case of high lubricant pressure, it opens said annular gap.

These measures have the effect that the annular gap is automatically closed in response to the pressure conditions in the lubricant and in the sausage meat so that, with the aid of very simple means, the sausage meat is prevented from penetrating into the annular gap and from clogging said annular gap.

In this connection, it will be particularly advantageous when the pretensioned spring is a rubber-elastic ring. When the inner surface of the ring defines an inner wall surface of the tube, the closing force of the rubber-elastic ring is additionally increased by the sausage meat pressure. As is generally known, rubber and similar materials are incompressible so that the ring, which is fixed on three sides thereof, will bulge towards the sausage meat. This deformation will be eliminated very rapidly not only due to the force of elasticity but also due to the active pressure of the sausage meat when the pressure in the lubricant is no longer sufficiently high.

In order to keep the sliding resistance of the sausage meat in the tube as low as possible also in all other respects, the inner wall of the sliding piston and the inner wall of the ring can define a virtually stepless annular surface together with the inner wall of the tube.

When the apparatus according to the present invention constitutes a component of a sausage filling machine provided with an outlet for the sausage meat to be filled into a casing and with a twist-off device, which follows said outlet and which comprises a twist-off gear unit for rotating the filling tube, and with a brake-ring gear unit, a structural simplification can be achieved by providing the tube in a stationary manner between the outlet and the twist-off gear unit.

The mass-carrying tube can also be a stationary tube, which is connected to a sausage filling machine and which serves to carry out a socalled "straight filling operation".

Figure 2:
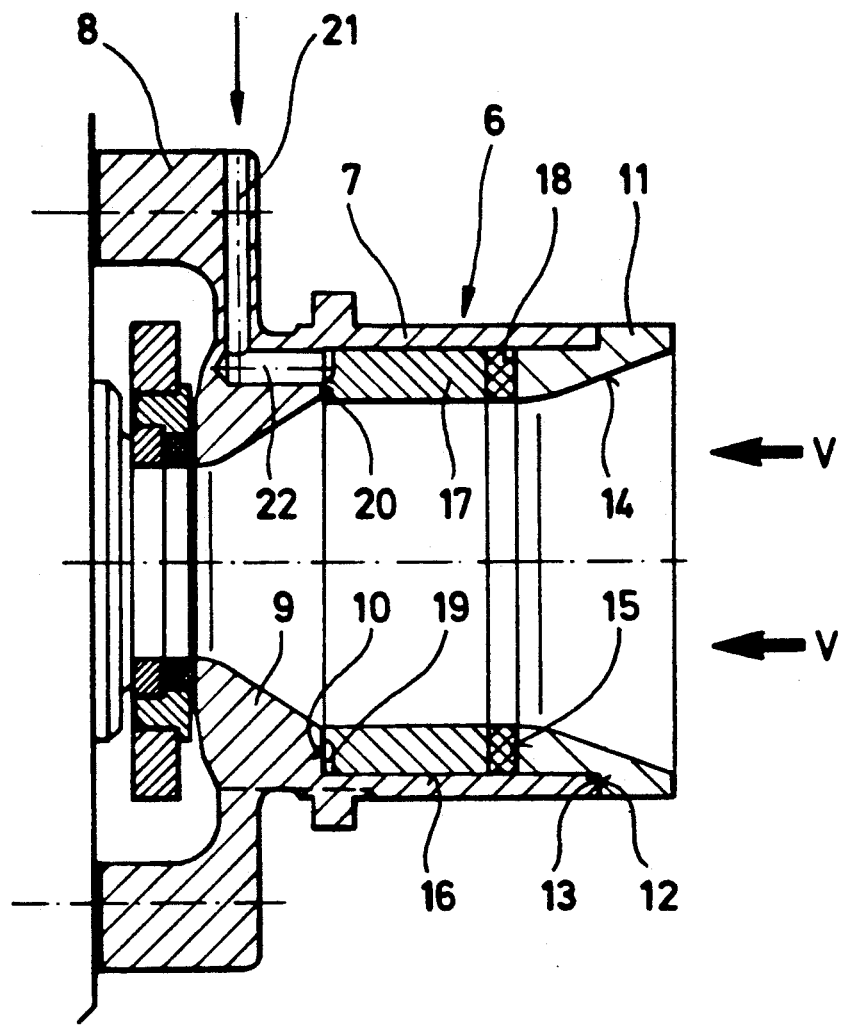

Additional advantages of the present invention will be evident from the description following hereinbelow in connection with the drawing, in which FIG. 1 shows a schematic side view of a filling machine and FIG. 2 shows, on an enlarged scale, an axial section through the apparatus for conducting the sausage meat under feed pressure.

In the examples, the inventive concept is explained on the basis of a sausage filling machine in the case of which water is used as a lubricant.

In FIG. 1, reference numeral 1 refers to the sausage filling machine, which is outlined by a dot-and-dash line and which is, as is usually the case, provided with an outlet 2 towards which the sausage meat is transported by a conveying device, e.g. by means of a piston, by generating an adequate feed force.

The sausage meat is pressed through a nozzle 3, which is caused to rotate by means of a twist-off gear unit 4.

For carrying out the twist-off operation, a brake-ring gear unit 5 is additionally provided in the manner known. A tube 6 is inserted between the outlet 2 and the nozzle 3 or rather the twist-off gear unit 4, the structural design and the function of said tube being explained in connection with FIG. 2.

In the case of the embodiment shown in the drawing, the tube 6 consists of a sleeve 7, which widens outwardly towards the twist-off gear unit 4 so as to define an annular bead 8 and which narrows towards the nozzle in the form of a funnel 9.

At the beginning of the funnel 9, the sleeve 7 is provided with a shoulder 10.

The direction of transport of the sausage meat is indicated by the arrows V.

A connecting sleeve 11 is pushed onto the end of the sleeve 7 defining the rear end when seen in the direction of transport, said connecting sleeve 11 abutting on the end face 13 of the sleeve 7 via a collar 12.

The connecting sleeve 11 narrows in the direction of transport of the sausage meat in the form of a cone 14.

At the end of the cone, the connecting sleeve is provided with a shoulder 15 so that an inner annular recess 16 is defined by the two shoulders 10 and 15 and by the inner surface of the sleeve 7, said annular recess 16 having arranged therein a sleeve-shaped sliding piston 17.

The sleeve-shaped sliding piston is a bit shorter than the annular recess 16 so that there is room for a ring 18 between the rear end of the sliding piston 17 and the shoulder 15 following the cone 14, said ring 18 being made from a rubber-elastic material.

The front end face of the sliding piston 17 is provided with an annular groove 19, which is delimited on the inner side thereof by an annular shoulder 20 located at the end face and protruding axially beyond the annular groove.

A radial bore 21 is provided in the annular bead 8 of the sleeve 7, said radial bore 21 communicating with an axial bore 22. This bore 22 opens into the annular groove 19.

The radial bore 21 is connected to a water conduit 23, as is schematically shown in FIG. 1.

Water is pressed through said water conduit 23 by means of a pump 24, e.g. a rotary pump.

The water pump 24 can be driven by a speed-controlled electric motor 25.

When water is used as a lubricating film, the pump 24 can be connected directly to the local water conduit. It is, however, just as well possible to suck a fluid from a reservoir 26 for the purpose of producing a lubricating film, this possibility being indicated in FIG. 1.

The sleeve-shaped sliding piston 17 is slidingly fitted in the sleeve 7 so that it is adapted to be axially displaced against the force of the rubber-elastic ring 18. The rubber-elastic ring 18 is pretensioned to a substantial degree so that the sleeve-shaped sliding piston 17 has its annular shoulder 20 pressed against the shoulder 10.

The tapering end of the cone 14 merges with a diameter, which corresponds to the internal diameter of the ring 18 and to the internal diameter of the sliding piston 17 so that these parts define a virtually stepless inner annular surface.

The new apparatus operates as follows:

When the sausage filling machine is started, the drive motor 25 for the water pump 24 is switched on simultaneously so that the pump 24 presses water into the annular groove 19 of the sliding piston 17 through the conduit 23 and the bores 21 and 22, said sliding piston 17 having thus applied thereto said water pressure at the end face thereof. The pressure of the water is clearly higher than the pressure of the sausage meat pressed through the interior of the tube 6 towards the nozzle 3.

The pretension of the ring 18 is chosen such that, in the case of a specific minimum pressure of the water of e.g. 6 bar, the sliding piston 17 is axially displaced to the rear by a very small amount so that a very small annular gap is defined between the annular shoulder 20 and the shoulder 10, the water passing through said annular gap as a very thin film and spreading uniformly over the inner surface of the funnel 9 and the subsequent walls for the sausage meat so that a very thin lubricating film is provided between the surface of the sausage meat and the inner walls guiding the sausage meat, said lubricating film reducing the friction between the sausage meat and said inner walls to a high extent so that "smearing" of the sausage meat at the surface of the sausage meat roll is avoided.

The necessary annular gap between the annular shoulder 20 and the shoulder 10 is established automatically by means of the stream of water supplied.

If, in the case of malfunction, the water pressure drops, the rubber-elastic ring 18 will automatically press the annular shoulder 20 onto the shoulder 10 so that the sausage meat is prevented from penetrating into the annular gap between the two shoulders, whereby clogging of said annular gap is automatically prevented. This applies, of course, also to cases in which, due to some kind of malfunction, there is temporarily no supply of water at all.

The water volume stream required for producing a lubricating film depends on the desired thickness of the lubricating film as well as on the internal diameter of the nozzle and the filling material volume stream, i.e. the speed at which the sausage meat is transported. In accordance with the pressure of the filling material (sausage meat pressure) and the pretension of the sealing means, the necessary pressure is established such that the necessary amount of liquid can be supplied. It follows that the supply of a preselected water volume stream is effected independently of the pressure in the sausage meat.

We claim:

1. In an apparatus for conducting a pasty mass under feed pressure through a tube which carries said mass and the interior of which communicates via an annular groove and an annular gap with a supply of lubricant which is forced under high pressure between the inner wall of the tube and the surface of the pasty mass, the improvement wherein said tube has an inner annular recess having arranged therein a sleeve-shaped sliding piston, the end face of which has an annular groove acted upon by the lubricant and an annular shoulder protruding beyond the annular groove, said sliding piston being adapted to be axially displaced within said inner annular recess against the force of a pretensioned spring in such a way that, in the case of low lubricant pressure, it closes the annular gap with the annular shoulder and in the case of high lubricant pressure, it opens said annular gap.

2. The apparatus of claim 1, wherein the pretensioned spring is a rubber-elastic ring.

3. The apparatus of claim 2, wherein the inner surface of the ring defines an inner wall surface of the tube.

4. The apparatus of claim 2 or 3, wherein the inner wall of the sliding piston and the inner wall of the ring define a virtually stepless annular surface together with the inner wall of the tube.

5. A sausage meat filling machine comprising the apparatus of claim 1, 2 or 3 as a component of the machine, said tube having an outlet for the sausage meat to be filled into a casing, a twist-off device which follows said outlet and which includes a twist-off gear unit and a brake-ring gear unit, said tube being provided in a stationary manner between the outlet and the twist-off gear unit.

* * * * *